United States Patent Office 3,336,730
Patented Aug. 22, 1967

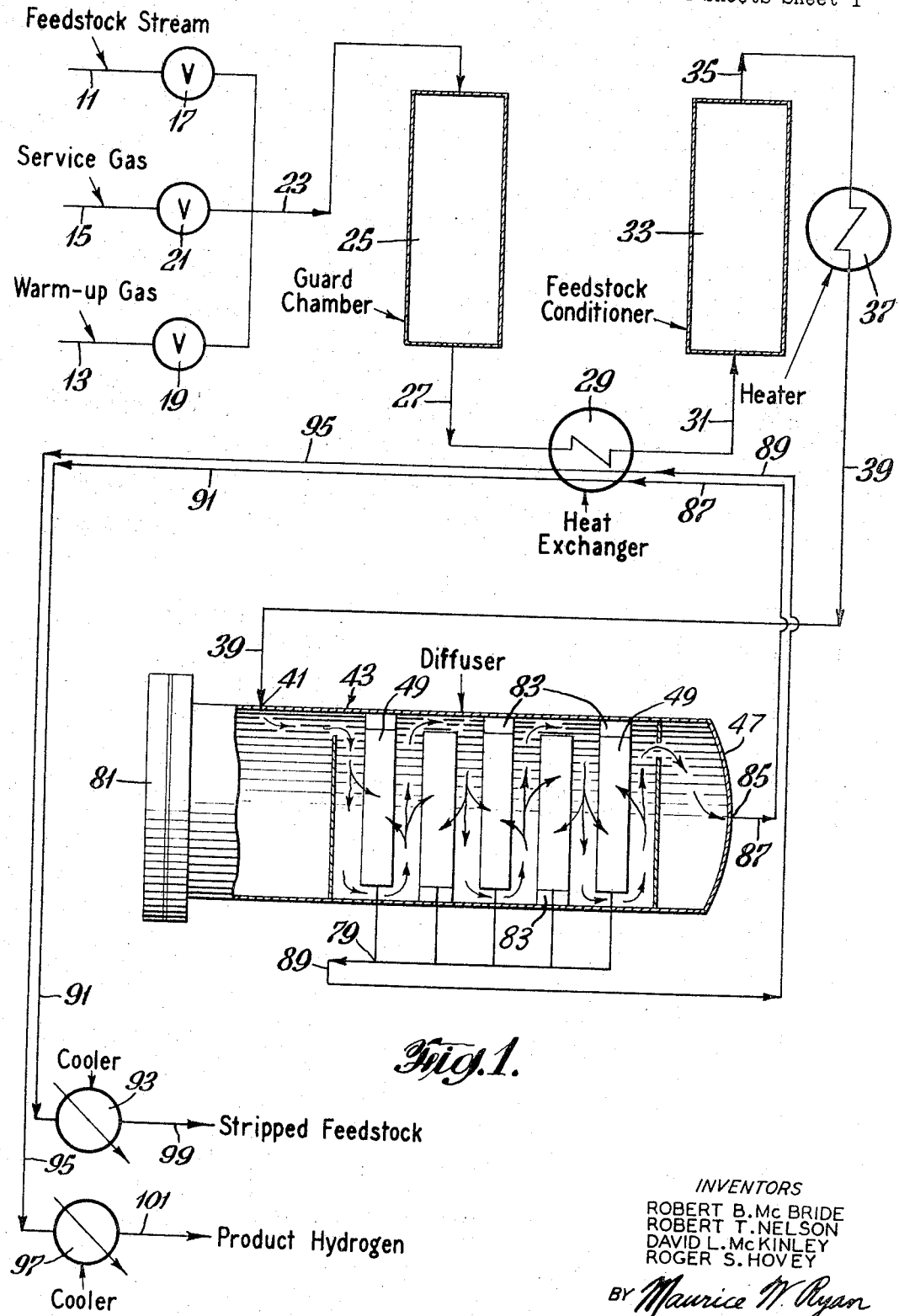

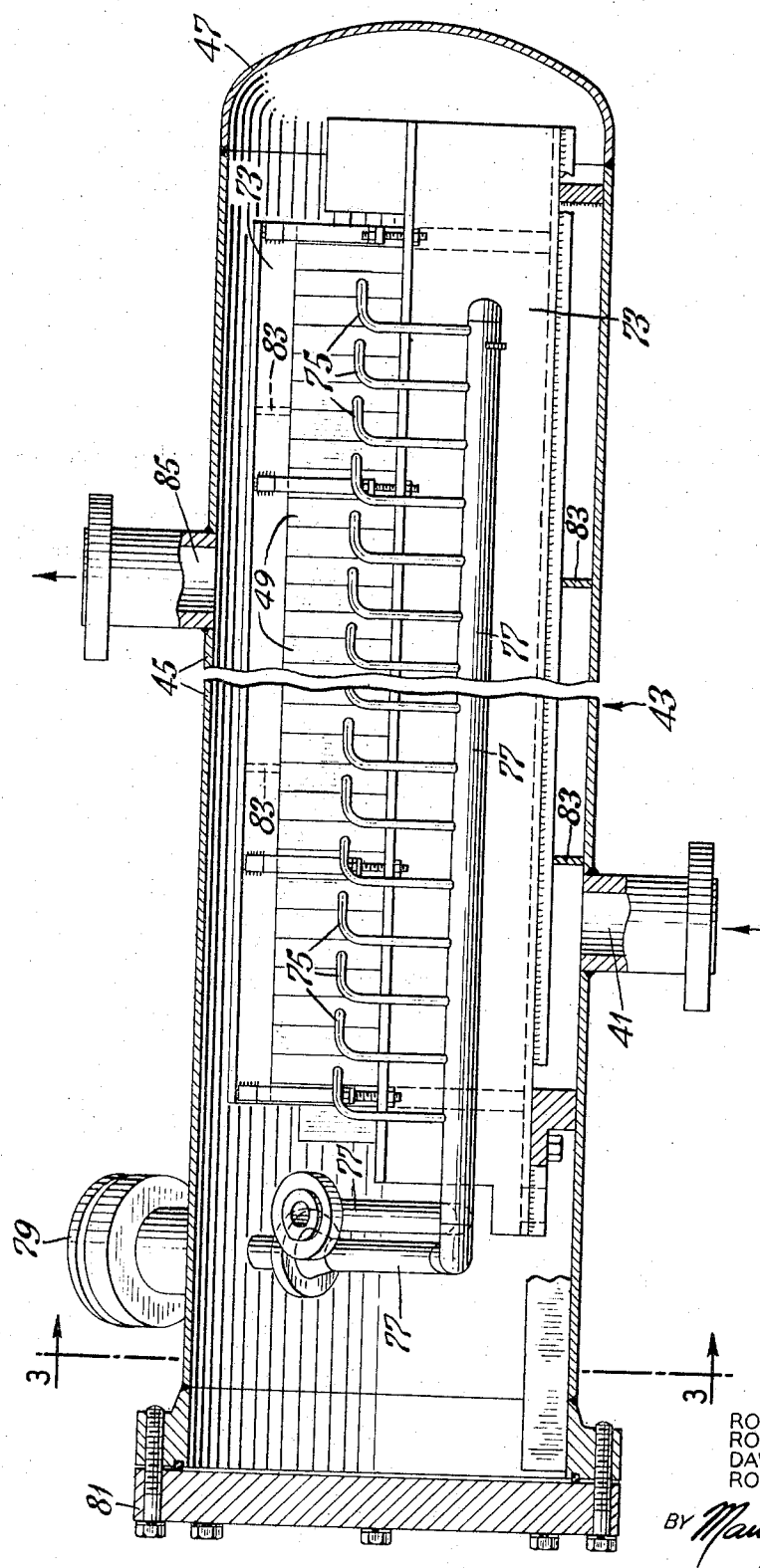

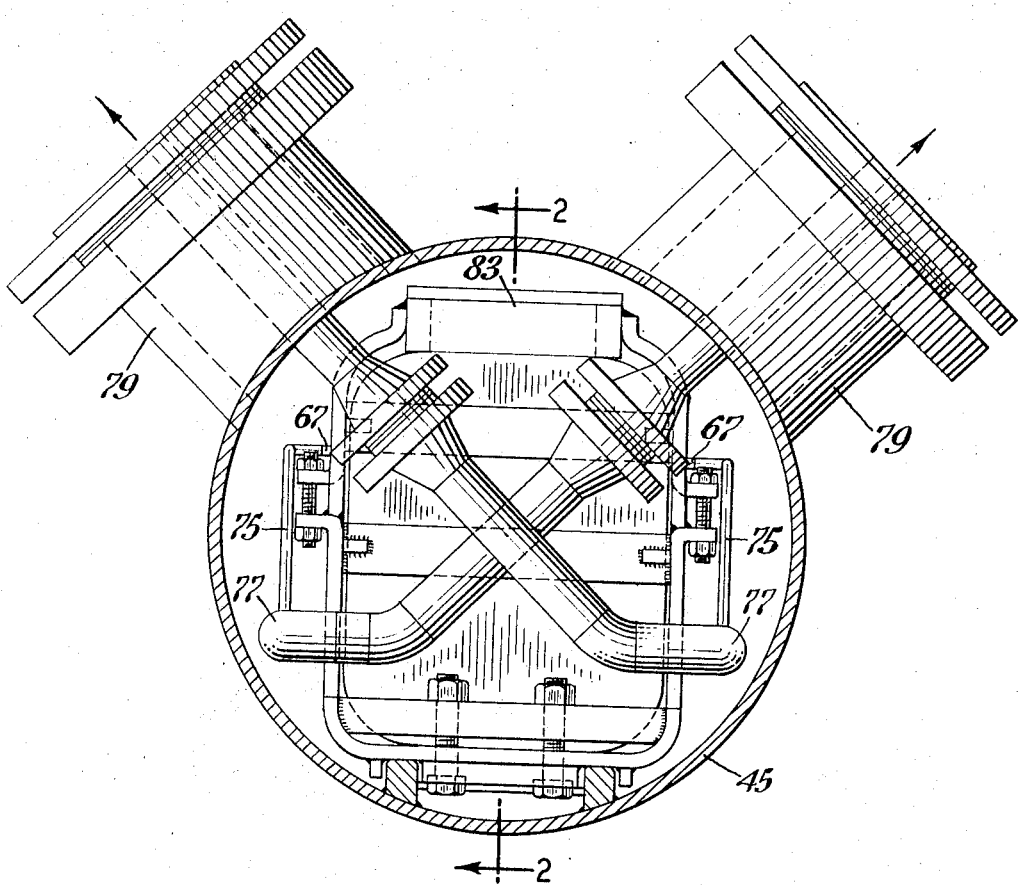

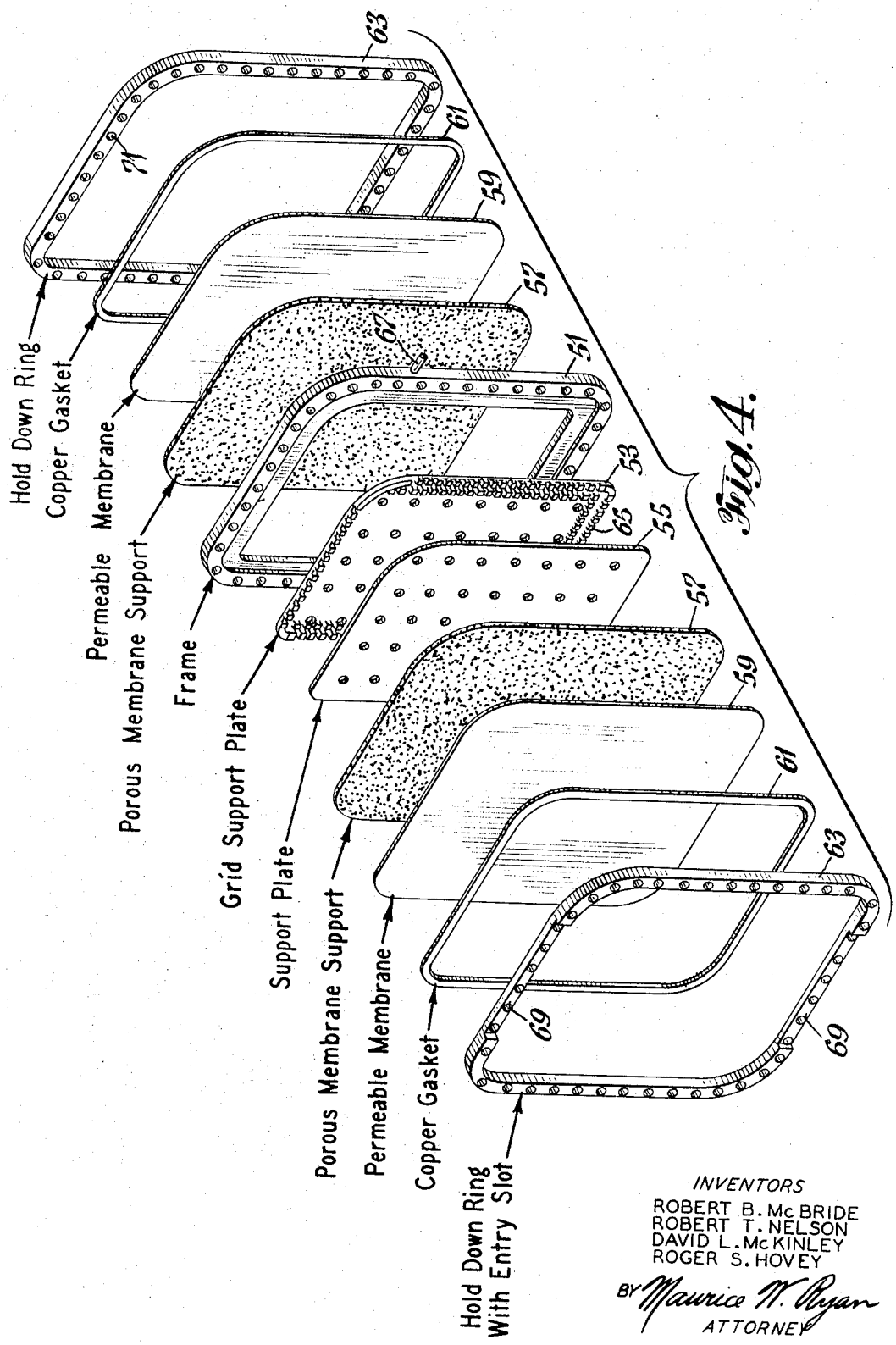

3,336,730
HYDROGEN CONTINUOUS PRODUCTION METHOD AND APPARATUS
Robert B. McBride, Robert T. Nelson, David L. McKinley, and Roger S. Hovey, South Charleston, W. Va., assignors to Union Carbide Corporation, a corporation of New York
Filed Nov. 17, 1964, Ser. No. 411,928
8 Claims. (Cl. 55—16)

This invention relates to continuous hydrogen production and more particularly to a method and apparatus uniquely suitable for producing high purity hydrogen continuously in large volumes by means of directing a specially treated hydrogen-containing source or feedstock stream against hydrogen-permeable barriers which permit the passage of hydrogen therethrough but are impermeable to other gases.

The selective permeability of certain metals for particular gases is known. While the exact mechanism which permits a particular gas to pass through an otherwise impervious metal barrier is the subject of several varying theoretical theses, it can be best understood by considering the selective permeability of palladium for hydrogen.

The basic technique of directing a multicomponent feedstock stream containing hydrogen against a hydrogen-permeable barrier such as palladium and thereby causing the hydrogen in such stream to diffuse through the barrier while restraining the other other constituents of the stream at the first side of the barrier is known. When, under suitable conditions of temperature and pressure, a hydrogen-containing stream impinges on a surface of a palladium sheet or foil, the molecular hydrogen dissociates into ions of hydrogen through what is considered to be the catalytic effect of the palladium metal. If a pressure differential is maintained across the barrier so that the pressure is lower on the remote or downstream side, the dissociated hydrogen will pass through the lattice structure of the palladium foil and recombine into molecular hydrogen as it leaves the downstream face of the foil. Since, in this diffusion process, none of the other feed stream constituents pass through the barrier, the hydrogen product is of exceptionally high purity. Efforts to adapt this basic phenomenon to practical commercial scale high purity hydrogen production have brought about the development of numerous diffusion apparatus, some utilizing flat plate type diffusion elements and others using tubes overlaid with palladium foil. It must be acknowledged however, that prior to the time of the present invention, diffusion apparatus available to industry has been viewed collectively as less than completely satisfactory for economical high volume high purity hydrogen production.

With this then being the state of the art, the present invention was conceived and developed to provide for the economical and relatively uncomplicated continuous production of high purity hydrogen.

The present invention further comprehends adaptation of the basic diffusion phenomenon described hereinabove into a unique and effective method and apparatus combination for diffusion hydrogen production having outstanding advantages over previously known hydrogen diffusion methods and apparatus.

The invention further provides a trouble-free method and apparatus for continuous hydrogen production, enabling users to enjoy highly efficient operation with minimal down time and maintenance.

A further advantage provided by the apparatus of the present invention is that it may be automated to the extent that only minimal human supervision is required in its operation.

A still further and significant contribution of the present invention is that it makes available for the first time large volumes of high purity hydrogen at low cost, opening the way for accelerated development work in many chemical production industry processes which have been hampered by short supply of required hydrogen.

In general, the method and apparatus of the present invention comprehends passing a hydrogen-containing feedstock stream through a guard zone filled with an adsorbent substance which removes and retains any solids or heavy hydrocarbons or oils; a conditioning zone wherein certain constituents other than hydrogen are acted on and rendered innocuous to the diffusional characteristics of the feedstock; a heat exchanger wherein heat from the product hydrogen and the stripped feedstock stream; a heater zone wherein additional heat is imparted to the feedstock stream to raise its temperature high enough to maintain a preselected diffusion temperature; and a diffusion zone wherein the feedstock stream is directed to impinge on a multiplicity of palladium or palladium alloy foil surfaces on discrete diffusion drum elements. From the diffusion zone, two streams emerge, one being the hydrogen product stream which is manifolded from the several downstream sides of the multiplicity of diffusion foils, and the other the stripped gas stream i.e., the feedstock stream less the hydrogen which has permeated through the diffusion barriers. Both streams are passed through the heat exchanger recited hereinabove and give up some of their heat to the incoming feedstock stream. If further cooling of either the product hydrogen or the stripped gas, or both, is required, the streams are passed through further heat removal apparatus such as for example, water coolers.

With the foregoing and other advantageous features in view which will be come apparent in the ensuing disclosure, the invention will now be described with greater particularity and with reference to the appended drawings wherein:

FIGURE 1 is a schematic flow diagram showing an arrangement of apparatus components according to the present invention;

FIGURE 2 is a longitudinal sectional view through a typical diffusion shell comprising the diffusion zone;

FIGURE 3 is an end sectional view taken along lines 3—3 of FIGURE 2;

FIGURE 4 is an isometric exploded view of a discrete diffusion barrier drum element of the type used multiply in the diffusion shell of FIGURES 2 and 3.

Referring to the drawings, particularly FIGURE 1, three inlet conduits 11, 13, 15 are shown connected respectively through valves 17, 19, 21 to an inlet header 23. Conduit 11 is the feedstock stream supply and carries any hydrogen-containing feedstock stream to the apparatus arrangement. Conduits 13 and 15 are auxiliary conduits to supply warm-up gas required in starting operations and a purge gas used in cleaning the system as will be explained in greater detail hereinafter. The inlet header 23 carries the hydrogen-containing feedstock stream to a guard chamber 25 which is filled with an adsorbent substance such as molecular sieves and constitutes the zone in which solid contaminant particles, compounds of sulfur, oils and any heavy hydrocarbons are removed from the feedstock stream. The guard chamber is sized and designed to meet system flow requirements and occasions only minimal velocity and pressure drop of the feedstock stream flowing therethrough. In certain instances it has been found desirable to install two similar guard chambers in parallel with appropriate by-pass valving so that one can always remain in service while the other is reactivated to unload the adsorbent filler. Hot stripped gas from the diffuser may be utilized advantageously to reactivate the adsorbent of the guard chamber out of service. Here it should be noted that the guard chamber may alternatively be located between heat exchanger 29 and feedstock conditioner 33, both of which will be described hereinafter, should design requirements so indicate in particular instance.

From the guard chamber 25, the feedstock stream is carried through a conduit 27 to a heat exchanger 29 wherein heat is imparted to said feedstock from the hydrogen product stream and the stripped gas stream emerging from the diffuser. Product hydrogen conduit 89 and stripped gas conduit 87 connect respectively from the diffuser 43 to heat exchanger 29 for this purpose and further product hydrogen conduits 95-101 and stripped gas conduits 91-99 extend respectively from heat exchanger 29 and coolers 97 and 93, if such are used, to conduct these respective gases to their ultimate points of utilization, storage or other disposition. The heat exchanger 29 thus serves the dual purpose of transferring useful heat to raise the temperature of the feedstock stream towards the desired temperature for diffusion and to cool the product hydrogen and stripped gas streams, and acts in total as a heat conservor or economizer as persons familiar with continuous process techniques will appreciate.

Conduit 31 carries the feedstock stream from heat exchanger 29 to a feedstock conditioner 33, which is a component designed to pretreat whatever particular feedstock composition is used in a manner to enhance its diffusional characteristics. Most available feedstock source contain undesirable and harmful constituents which are not adsorbed in the guard chamber 25 and it is desirable therefore to pretreat the feedstock stream in a conditioner 33 to render these constituents innocuous by removal, catalysis, chemical reaction or whatever other method may be dictated by the circumstances. Pretreatment methods for conditioning feedstock streams according to their particular individual characteristics are not considered specifically and individually within the scope of this invention but it is to be noted that the generic concept of pretreatment at this point in the process of the present invention is indeed comprehended to the extent that diffusional characteristics of the feedstock gas are enhanced.

From the feedstock conditioner 33, a conduit 35 carries the hydrogen-containing feedstock stream to a final heater 37. Heater 37 is included in the arrangement to impart sufficient additional heat to the feedstock stream to raise its temperature high enough to attain and maintain a preselected diffusion temperature at which it is known that optimum dissociation of the hydrogen molecules will occur in the diffusion zone. Heater 37 may be gas-fired or electrically powered and of any conventional design. The maximum temperature obtained in heater 37 should be low enough to avoid cracking of any saturated hydrocarbons which may be present in the feedstock stream. Aside from this precautional limitation concerning the heater, heater controls are desirably adjusted so that a diffuser temperature in the range of from about 300° C. to about 550° C. is maintained in the main diffuser element. From heater 37, a conduit 39 carries the feedstock stream to an inlet 41 of a diffuser 43, the structural details of which are shown in FIGURES 2, 3, and 4.

Referring to the drawings, diffuser 43 is seen to comprise an elongate hollow cylindrical shell 45 closed at one end by an integrally formed bell 47. In the hollow interior of the shell 45 there is disposed in stacked arrangement a multiplicity of discrete diffusion drum elements 49. FIGURE 4 of the drawings shows isometrically the constituent parts of each individual drum element. Referring to FIGURE 4, each drum element consists of a main frame 51 into which is assembled a pair of perforated support plates 53, 55. Next applied and assembled on each respective outer facia surface of the support plates are a porous membrane support 57, a hydrogen-permeable membrane 59 of palladium or palladium alloy, a framing gasket 61 and a hold down ring 63. The entire assembly is held firmly together to define a sandwich-like structure with frame 51 centrally disposed and a pair of hold down rings 63 defining outer frame-like layers. At least one of the support plates, e.g. 53, is provided with waffle-like surface protrusions 65 arranged and disposed to cause the formation of a hollow space centrally of the main frame 51 when the support plates are assembled thereto. A product hydrogen take-off nipple 67 extends through a wall of the main frame 51 into access with the space defined by the support plates 53, 55. One of each pair of the hold down rings 63 is provided with recessed surfaces or notches 69, the purpose of which will be explained hereinafter. Flush-headed screws or the like are used to complete the assembly, being installed in a peripheral array of screw holes 71 provided in the main frame and the hold down rings.

A multiplicity of these drum elements are stacked as shown in FIGURE 2 and held together on a removable rack assembly 73 which may be slideably inserted and removed on any suitable interior supports in the shell 45. Prior to insertion in the shell, the nipples 67 extending from each main frame 51 are manifolded through conduits 75 to a hydrogen product take-off header 77. For convenience in design, alternate drum elements in the stacked array may be turned around to provide a dual manifolding and take-off arrangement as shown in the drawings. With these interior components in place in the shell 45, the hydrogen take-off headers are in register with hydrogen outlet flanges 79. To complete the assembly, a cover 81 is bolted over the open end of shell 45.

In operation, the multi-component feedstock stream containing the hydrogen which is of interest enters the diffuser 43 at the diffuser inlet 41 and tends to flow through and fill the shell structure. The notches 69 described hereinabove located repeatedly along the array of diffuser drum elements, permit the passage of the feedstock stream to impinge directly on the multiple palladium barrier faces. Heat from the feedstock stream is imparted to the palladium or palladium alloy membranes 59 to a degree sufficient to bring about the catalytic dissociation effect of palladium in the presence of hydrogen and the hydrogen molecules in the stream dissociate, and pass as ions of hydrogen through the lattice structure of palladium, then recombine on the other side into molecular hydrogen. Thus, pure hydrogen collects as product in each of the enclosed spaces defined by the support plates of each diffuser drum element 49. The product hydrogen then passes through the nipples 67, manifolding conduits 75 and take-off headers 77 to hydrogen outlets 79. This multiple diffusion takes place in what might be considered parallel, that is the dissociation and diffusion phenomena take place simultaneously at all of the palladium surfaces in the array. For the purpose of effecting and assuring the continuance of complete contact of the feedstock gas with the palladium surfaces for the required time, however, an arrangement of baffles 83 may be provided as shown in the drawings and serves advantageously in directing feedstock stream flow so as to obtain optimum hydrogen stripping from the feedstock gas. At the end of whatever flow path is provided internally of the diffuser shell 45, a stripped gas outlet 85 is provided to conduct the hydrogen-depleted feedstock gas from the diffuser 43. In the particular embodiment described, a stripped gas conduit 87 and a product hydrogen conduit 89 conduct the hot stripped gas and product hydrogen streams respectively from stripped gas outlet 85 and product hydrogen flanges 79 to the heat exchanger 29 described hereinbefore, wherein useful heat from these streams is transferred beneficially to the incoming feedstock stream.

While the stripped gas and product hydrogen streams eluting from the diffuser are cooled to a considerable extent by their passing through heat exchanger 29, additional cooling may be provided by coolers such as water coolers downstream of the heat exchanger. The FIGURE arrangement provides a conduit 91 to carry partially cooled stripped gas from heat exchanger 29 to a stripped gas cooler 93 and conduit 95 to conduct the partially cooled product hydrogen from heat exchange 29 to a hydrogen cooler 97.

In addition to several other factors, the rate of hydrogen transfer through a permeation barrier varies in proportion to the hydrogen partial pressure at the upstream side of the barrier. The necessary pressure differential across the barrier may be obtained in a number of ways. In some instances the source pressure of the feedstock stream and the pressure in the product hydrogen collection system may be such as to provide the required pressure differential without further apparatus. Unsatisfactorily low pressures in feedstock source streams may be boosted by any conventional pumping or intensification arrangement. Alternatively, or in combination with pressure increasing apparatus on the input side of the system, aspirating apparatus may be advantageously used to pull a vacuum at the product hydrogen output end of the system.

A stripped feedstock gas conduit 99 is provided to conduct the hydrogen-depleted feedstock stream from water cooler 93 to wherever else this stream may be eventually used or disposed of. A product hydrogen conduit 101 is provided to conduit the product hydrogen from cooler 97 to any appropriate point for storage, utilization and the like.

Example I

In a particular embodiment of apparatus according to the present invention designed to produce approximately 30,000 cubic feet of hydrogen per day having a purity in the order of 99.99%, equipment such as described hereinabove was constructed in an outdoor area of about 30 feet by 15 feet adjacent a chemical plant from which a feedstock source was available. The feedstock source consists mainly of methane $CH_4$ and hydrogen $H_2$, normally containing from 50% to 60% $H_2$ by volume and the rest methane. There are, of course, other constituents present in varying relatively minor amounts. The feedstock gas used in a particular run was analyzed and the analysis is illustrative for the purposes of this disclosure. An analysis by gas chromatography was as follows:

| | Percent |
|---|---|
| Hydrogen and methane $H_2$—$CH_4$ | 97.73 |
| Carbon monoxide $CO$ | 0.585 |
| Ethane $C_2H_6$ | 0.2 |
| Ethylene $C_2H_4$ | 0.69 |
| Acetylene $C_2H_2$ | 0.15 |
| Propane $C_3H_8$ | 0.29 |
| Isobutane $C_4H_{10}$ | 0.08 |
| Normal butane $N$—$C_4H_{10}$ | 0.08 |
| Isopentane $C_5H_{12}$ | 0.002 |
| Normal pentane $N$—$C_5H_{12}$ | 0.001 |
| Residues | 0.19 | and an analysis by a mass spectrometer as follows:

| | |
|---|---|
| Hydrogen $H_2$ | 56.1 |
| Methane $CH_4$ | 42.7 |
| Ethane $C_2H_6$ | 0.2 |
| Ethylene $C_2H_4$ | 0.8 |
| Propylene $C_3H_6$ | 0.04 |
| Carbon dioxide $CO_2$ | 0.04 |
| Normal butane $N$—$C_4H_{10}$ | 0.06 |
| Carbonyls (CO) | p.p.m.__ 7.69 |
| Water vapor $H_2O$ | p.p.m.__ 42 |

(p.p.m. means parts per million).

The feedstock source available for this installation is at a pressure of 270 p.s.i.g. and an ambient temperature of 20° C. Besides the feedstock source, a stream of methane and a stream of nitrogen are provided for warm-up and purging operations. The guard chamber for this installation consists of a cylindrical vessel filled with a volume of about 2 cubic feet of 13× molecular sieves to serve as an adsorbent for removal of contaminant particles and the like. A 20 square feet heat exchanger is provided to raise the temperature of the feedstock gas approximately 150° C., the heat being derived from condensation of 200 p.s.i.g. steam from an outside source. A feedstock conditioner for this installation consists of a cylindrical vessel containing a 2 cubic feet volume of commercially available Girdler G63A in 3/16 inch pellet form as a hydrogenation and deoxo catalyst for the prehydrogenation of trace quantities of certain unsaturated hydrocarbons present in the feedstock stream and the elimination of traces of oxygen. An electric heater rated 35 kw. is provided to impart the final heat to the feedstock stream raising its temperature to approximately 400° C. in order to produce an effective temperature at the diffuser of 350° to 400° C. In this particular installation supplemental heating is also provided at the diffuser unit to make up any B.t.u. losses occurring between the heater and the diffuser.

The diffusion unit itself comprises a 24 inch outside diameter shell of SA-387 Grade B steel, approximately 5 feet long designed for an operating pressure of 650 p.s.i.g. at a maximum temperature of 750° F. Twelve diffusion drums are provided having double-faced palladium foils 1.2 square feet each to provide a total permeation surface area of 29 square feet. The permeating foil itself for a particular set of operating parameters has been found most suitably to be palladium alloyed with about 5 weight percent silver. Manifolded hydrogen collection pipes carry out the product hydrogen into four hydrogen product headers from which the hydrogen is passed through a parallel array of four water cooling coils wherein the outlet hydrogen temperature of about 360° C. is reduced to 30° C.

Before the installation of the diffusion elements or drums in the diffusion shell, the installation was tested with nitrogen for pressure leaks in a conventional pressure testing procedure. After the diffuser drum assembly was installed into the shell and the head 81 assembled thereto, the unit was purged with nitrogen for about one-half hour. During the purging, the nitrogen, of course, vents only through the stripped gas lines at the outlet side of the assembly.

The unit is brought up to operating temperature by passing a warmed methane stream therethrough until a temperature of at least 350° C. is attained at the stripped gas outlet. When temperature stability has been attained, the hydrogen-methane feedstock stream is admitted at a rate of about 7,200 cubic feet per hour at a pressure of about 240 p.s.i.g. and product hydrogen can be removed from the product lines of the system. It is important during start-up procedures, as well as shut-down procedures, to avoid permitting high pressure hydrogen, for instance in the feedstock stream, to contact the palladium or palladium alloy permeator foils at temperatures below about 330° C., and it is for this reason that a non-hydrogen-bearing gas such as methane is used for warming up and cooling down the apparatus.

In extensive periods of several months of continued operation this installation produced an average hydrogen output of 30,000 cubic feet per day, the hydrogen being 99.99% pure on the average.

Example II

In another embodiment of apparatus according to the present invention designed to produce 3.5 million cubic feet of hydrogen per day having a purity in the order of 99.99%, equipment according to the above description was arranged in an outdoor area of about 75 feet by 34 feet in a chemical plant yard. A feedstock source available from the chemical plant has substantially the same make-up as the source described for Example I above but with higher hydrogen concentrations and is available at a pressure of 580 p.s.i.g. and an ambient temperature of about 20° C. A high purity nitrogen stream is provided for warm-up and purging operations. The guard chamber in this installation consists of a cylindrical vessel filled with a volume of 32 cubic feet of type 4A molecular sieves to serve as an adsorbent for the removal of contaminant particles, oils, etc. Type 4A molecular sieves are composed of sodium zeolite A and the type 13X molecular sieves of Example I above are composed of sodium zeolite X. Both are commercially available from the Linde Division of Union Carbide Corporation, New York City, New York. In this particular installation the line extending from the guard chamber is bifurcated and runs to a parallel arrangement of two heat exchangers. Each heat exchanger has 65.8 square feet of feedstock gas heating surface and is designed to raise the temperature of the feedstock gas approximately 125° C., heat being derived from the product hydrogen and stripped gas streams emanating from the diffuser. The heated feedstock stream is recombined in a single conduit after the heat exchangers and connects to the input side of a feedstock conditioner. A feedstock conditioner for this installation consists of a cylindrical vessel containing a 70 cubic feet volume of Girdler type G63A 3/16 inch pellets as a hydrogenation catalyst to effectively treat unsaturated hydrocarbons in the feedstock stream. These pellets are available commercially from the Girdler Division of the Chemitron Corporation, Louisville, Kentucky. The temperature rise in this feedstock conditioner is from about 150° C. to about 230° C. From the feedstock conditioner, the feedstock stream conduit is again bifurcated and connected to a parallel arranged pair of heat exchangers, one of which has 51.8 square feet of heat transfer surface and takes heat from the stripped gas stream and the other of which has 65.8 square feet of heat transfer surface and takes heat from the product hydrogen stream. The feedstock stream is again recombined in a single conduit beyond this second set of heat exchangers and connects to the input side of a final heater. A gas fired heater furnishing approximately 927,000 B.t.u. per hour is provided to impart final heat to the feedstock stream, raising its temperature to approximately 400° C., in order to produce an effective temperature at the diffuser working surfaces of 380°–390° C.

The diffusion arrangement consists of four units arranged in series. Each unit comprises a 24 inch outside diameter shell of SA–387 Grade B steel, approximately 22 feet long designed for an operating pressure of 600 p.s.i.g. at a maximum temperature of 875° F. One hundred twenty diffusion drums are provided in each of the four diffusion units, each drum having two palladium alloy foil surfaces of 1.2 square feet to provide a total permeation surface area of 1,150 square feet in the four units. The permeating foil used in this installation is palladium alloyed with about 5 weight percent silver. Each diffusion unit is double-manifolded in accordance with the above description. Production hydrogen and stripped gas from the diffuser unit array pass through the heaters described hereinabove to impart heat to the incoming feedstock stream and then through a 58.5 square feet water cooler to reduce the product hydrogen temperature to about 30° C. The stripped gas outlet from the last of the four diffuser units also passes through the heaters decribed above to heat the feedstock stream and then through a 58.5 square feet water cooler to reduce the stripped gas temperature to about 30° C. In this particular installation, because of oxygen content in the feedstock stream, the stripped gas stream is dewatered in a conventional liquid-vapor separator arranged in the system after the cooler. The pressure testing, purging and warm-up operations involved in the operation of this arrangement of apparatus was substantially as described hereinabove in Example I.

Over a period of several weeks of continued operation, this installation produced hydrogen outputs in excess of 3,000,000 cubic feet per day, the hydrogen purity being 99.98% on the average.

What is claimed is:

1. A method for the continuous production of gaseous hydrogen which method comprises continuously passing a hydrogen-containing feedstock stream through a guard zone filled with an adsorbent substance, wherein which guard zone pre-selected constituents contained in said feedstock stream are removed; a conditioning zone wherein other certain constituents in said feedstock stream known to be detrimental to diffusional characteristics of said feedstock stream are acted on and rendered innocuous; a heating zone wherein a predetermined quantity of heat is imparted to said feedstock stream to rase its temperature high enough to maintain a pre-selected diffusion temperature; a diffusion zone wherein which said feedstock stream is directed to impinge on a multiplicity of surfaces selectably permeable to hydrogen and impermeable to other substances and wherein hydrogen contained in said feedstock stream is separated from other constituents in said feedstock stream; passing the hydrogen separated in said diffusion zone through a hydrogen cooling zone; and passing the hydrogen-depleted feedstock stream from said diffusion zone through a cooling zone.

2. A method according to claim 1 wherein the heat imparted to said feedstock stream in said heating zone is heat derived at least in part from the hydrogen cooling zone and the hydrogen-depleted feedstock stream cooling zone.

3. A method for the continuous production of gaseous hydrogen which method comprises continuously passing a hydrogen-containing feedstock stream through a guard zone filled with an adsorbent substance, wherein which guard zone pre-selected constituents contained in said feedstock stream are removed; a first heating zone wherein a predetermined quantity of heat is imparted to said feedstock stream; a conditioning zone wherein other certain constituents in said feedstock stream known to be detrimental to diffusional characteristics of said feedstock stream are acted on and rendered innocuous; a second heating zone wherein sufficient additional heat is imparted to said feedstock stream to raise its temperature high enough to maintain a pre-selected diffusion temperature; a diffusion zone wherein which said feedstock stream is directed to impinge on a multiplicity of substantially palladium surfaces selectably permeable to hydrogen and impermeable to other substances and wherein hydrogen contained in said feedstock stream is separated from other constituents in said feedstock stream; passing the hydrogen separated in said diffusion zone through a hydrogen cooling zone; and passing the hydrogen-depleted feedstock stream from said diffusion zone through a cooling zone.

4. A method according to claim 3 wherein the heat imparted to said feedstock stream in said first heating zone is heat derived from the hydrogen cooling zone and the hydrogen-depleted feedstock stream cooling zone.

5. Apparatus for the continuous production of substantially pure hydrogen gas comprising, in combination, inlet conduit means connecting from a continuous supply source of hydrogen-containing feedstock gas; a guard chamber filled with an adsorbent material suitable for the continuous adsorption of selected constituent materials other than hydrogen contained in said feedstock stream; heater means having a heating capacity to impart a quantity of heat to said feedstock stream sufficient to raise the temperature of the feedstock gas to an extent known to effect a pre-selected temperature in a diffusion zone; a feedstock conditioner containing material capable of acting upon other certain selected constituents in said feedstock stream other than hydrogen, which other certain constituents are known to detrimentally affect diffusional characteristics of said feedstock stream; diffusion apparatus containing a multiplicity of surfaces of a material known to produce dissociation and permeation of hydrogen; outlet means on said diffusion apparatus for the continuous removal of substantially pure gaseous hydrogen; further outlet means on said diffusion apparatus for the continuous removal of hydrogen-depleted feedstock gas; first cooling means adapted to reduce the temperature of said substantially pure hydrogen to a pre-selected extent; second cooling means adapted to reduce the temperature of said hydrogen-depleted feedstock gas to a pre-selected extent; and respective conduit means connecting said guard chamber, heating means, feedstock conditioning means, diffuser, first cooling means and second cooling means.

6. Apparatus for the continuous production of substantially pure hydrogen gas comprising, in combination, inlet conduit means connecting from a continuous supply source of hydrogen-containing feedstock gas; a guard chamber filled with an adsorbent material suitable for the continuous adsorption of selected constituent materials other than hydrogen contained in said feedstock stream; first heater means having a heating capacity to impart a pre-selected quantity of heat to said feedstock stream; a feedstock conditioner containing material capable of acting upon other certain selected constituents in said feedstock stream other than hydrogen, which other certain constituents are known to detrimentally affect diffusional characteristics of said feedstock stream; second heater means having a heat-producing capacity sufficient to raise the temperature of the feedstock gas to an extent known to effect a pre-selected temperature in a diffusion zone; diffusion apparatus containing a multiplicity of surfaces of a material known to produce dissociation and permeation of hydrogen; outlet means on said diffusion apparatus for the continuous removal of substantially pure gaseous hydrogen; further outlet means on said diffusion apparatus for the continuous removal of hydrogen-depleted feedstock gas; first cooling means adapted to reduce the temperature of said substantially pure hydrogen to a pre-selected extent; second cooling means adapted to reduce the temperature of said hydrogen-depleted feedstock gas to a pre-selected extent; and respective conduit means connecting said guard chamber, said first heating means, said feedstock conditioning means, said second heating means, said diffuser, said first cooling means and said second cooling means.

7. A method for the continuous production of gaseous hydrogen which method comprises the continuously performed steps of
    (a) passing a hydrogen-containing feedstock stream through a guard zone filled with a substance adsorbent to certain known constituents contained in said feedstock stream and a conditioning zone containing hydrogenation catalytic material;
    (b) heating said feedstock stream from its initial temperature to a temperature of about 400° C.;
    (c) passing said feedstock stream into a diffusion zone wherein which said feedstock stream is directed to impinge on a multiplicity of palladium alloy surfaces and wherein hydrogen contained in said feedstock stream passes through said palladium alloy surfaces and is separated from other constituents in said feedstock stream;
    (d) passing the hydrogen separated in said diffusion zone through a hydrogen cooling zone; and
    (e) passing the hydrogen-depleted feedstock stream from said diffusion zone through a cooling zone;
while maintaining a pressure differential across the diffusion zone of from about 270 p.s.i.g. to about 580 p.s.i.g.

8. A method for the continuous production of gaseous hydrogen which method comprises the continuously performed steps of
    (a) passing a hydrogen-containing feedstock stream through a guard zone filled with molecular sieves adsorbent to certain known constituents contained in said feedstock stream and a conditioning zone containing hydrogenation and deoxygenation catalytic material;
    (b) heating said feedstock stream from its initial temperature to a temperature of about 400° C.;
    (c) passing said feedstock stream into a diffusion zone wherein which said feedstock stream is directed to impinge on a multiplicity of palladium alloy surfaces and wherein hydrogen contained in said feedstock stream passes through said palladium alloy surfaces and is separated from other constituents in said feedstock stream;
    (d) passing the hydrogen separated in said diffusion zone through a hydrogen cooling zone;
    (e) passing the hydrogen-depleted feedstock stream from said diffusion zone through a cooling zone; and
    (f) applying heat removed from the hydrogen and the hydrogen-depleted feedstock stream in steps (d) and (e) to heat the feedstock stream in step (b)
while maintaining a pressure differential across the diffusion zone of from about 270 p.s.i.g. to about 580 p.s.i.g.

References Cited

UNITED STATES PATENTS

| 2,589,297 | 3/1952 | Schwertz | 55—16 |
| 3,226,915 | 1/1966 | Pinney et al. | 55—158 |

FOREIGN PATENTS

| 1,289,659 | 2/1962 | France. |
| 972,093 | 10/1964 | Great Britain. |

REUBEN FRIEDMAN, *Primary Examiner.*

J. ADEE, *Assistant Examiner.*